Patented Feb. 21, 1939

2,148,325

UNITED STATES PATENT OFFICE 2,148,325

COMPOSITION OF MATTER

Augusto Schwind, Buenos Aires, Argentina

No Drawing. Application March 5, 1937, Serial No. 129,282. In Argentina January 5, 1937

10 Claims. (Cl. 106—2)

This invention relates to the manufacture of accumulator casings and the like. The word "casing" in this specification is intended to include also the covers and stoppers used for the closures of certain types of accumulators or for closing the filler openings.

The object of the present invention is to provide a composition of matter for the manufacture by moulding under pressure of the said cases, said composition of matter having certain novel and advantageous features.

Hitherto various types of mixtures and compositions for such purpose have been proposed, including mixtures having tar, pitch or bitumen as their principal component, but heretofore such principal component has always been of mineral origin. Such materials have, however, a natural tendency to adhere to the tools and moulds during the process of manufacture and are, furthermore, not capable of offering a satisfactory resistance to continued attack by sulphuric acid. If such materials are treated to remove their tendency to stick, they have been found to become very brittle.

I have discovered that vegetable pitch, and particularly pitch derived from non-coniferous trees, has properties which permit of its use as the base of a moulding composition for the manufacture of accumulator casings and the like, with considerable advantages both as regards the actual manufacture and the finished product.

Such pitches are free from fats and, preferably, those are selected for my composition of matter, which contain little or no natural resin. The most important property of these vegetable pitches, however, is that they can be treated to remove any natural resin they may contain, and thereby to render them non-sticky, without causing them to become brittle. A further advantage of these pitches is that if for any reason they become carbonized, the resultant mass is a non-conductor of electricity, whereas the mineral pitches and the like, become conductive on carbonization.

The vegetable pitches referred to are, according to the present invention, mixed with a filler, preferably a silicate filler, and an inorganic or organic fibrous binder, giving a composition which may be moulded when hot, to form casings which are found to be highly resistant to the action of sulphuric acid. The casings thus formed have likewise a high mechanical strength and an appearance similar to that of casings made of vulcanized rubber or mineral pitches, from which however, they are readily distinguished by the nature of the fracture on breakage and by the smell given off from fresh fractures.

Although I have found that resin-free vegetable pitches give satisfactory results when incorporated in a moulding composition as indicated above, the mechanical strength of the resulting moulded product may be further improved by adding to the composition a proportion of a polymerized synthetic resin.

A vegetable pitch capable of resisting for an indefinite time the action of a solution of sulphuric acid of specific gravity 1.3 at temperatures between 40° and 45° C. (which conditions hold in motor-car accumulators) is obtained by selecting preferably pitches derived from non-coniferous trees, as already indicated, since these pitches are in themselves either free of natural resins or contain very small quantities thereof. I prefer to use pitches the melting point of which is in the neighbourhood of 100° C. Such pitches represent the residues of distillation carried to the point at which the properties of the residues comply with the requirements outlined above.

Of the pitches derived from non-coniferous trees, the pitch obtained from beech-wood as a residue after all harmful or undesirable materials have been driven off, lends itself excellently to the manufacture of accumulator casings and the like.

As already stated, I prefer to use residues having a melting point in the neighbourhood of 100° C., but the present invention is not to be considered as limited to this figure, since the melting point should be selected by those skilled in the art to meet the requirements imposed by the conditions under which the finished product is to be used.

My novel composition of matter may suitably be made up as follows:

| | Per cent |
|---|---|
| Vegetable pitch | 40–60 |
| Silicates | 20–40 |
| Fibrous material | 8–28 |

If synthetic resin is added the above formula is modified as under:

| | Per cent |
|---|---|
| Vegetable pitch | 30–50 |
| Silicates | 15–35 |
| Fibrous material | 5–25 |
| Synthetic resin | 10–35 |

As filler, any silicate may be used which is an electrical insulator, is water-repellent and unattacked by sulphuric acid, as for example talc.

The fibrous material may, as already stated, be inorganic (asbestos) or organic (cotton, horsehair, wool and the like) or a mixture of organic and inorganic fibres. When a synthetic resin is added this should preferably be a condensation product capable of being melted and remelted, so as not to affect adversely the property which my composition of matter has, of being capable of being remelted after it has once been pressed.

The ingredients are mixed hot in a mixer until a homogeneous paste is formed. This paste may, if necessary, be stored in heated and closed kettles until required. The amount necessary to form the casing it is desired to make is taken and kneaded and/or rolled under conditions whereby loss of heat is avoided, whereupon the said amount is introduced in a mould adapted to be heated and cooled, and moulded under pressure. When the mould has been cooled the finished casing is withdrawn therefrom.

As has already been indicated, the casings made from the composition of matter according to this invention and by the method briefly described do not stick to the mould or to the die during the pressing. They are resistant to acids, photochemical effects and mechanical damage. They give a somewhat metallic ring and possess relatively high coefficients of resistance to compression and hardness.

I claim:

1. A composition of matter for the manufacture by moulding under pressure of casings, covers and stoppers for electric accumulators, which comprises a mixture of vegetable pitch derived from wood free from natural resins, a fibrous binder and a silicate filler.

2. A composition of matter for the manufacture by moulding under pressure of casings, covers and stoppers for electric accumulators comprising a mixture of a vegetable pitch derived from non-coniferous trees and free from natural resins, a fibrous binder and a silicate filler.

3. A composition of matter for the manufacture by moulding under pressure of casings, covers and stoppers for electric accumulators comprising a mixture of beechwood pitch free from natural resins, a fibrous binder and a silicate filler.

4. A composition of matter for the manufacture by moulding under pressure of casings, covers and stoppers for electric accumulators comprising a mixture of a vegetable pitch derived from wood free from natural resins, a fibrous binder and talc.

5. A composition of matter for the manufacture by moulding under pressure of casings, covers and stoppers for electric accumulators, comprising a mixture of a vegetable pitch derived from wood free from natural resins, an organic fibrous binder and a silicate filler.

6. A composition of matter for the manufacture by moulding under pressure of casings, covers and stoppers for electric accumulators, comprising a vegetable pitch derived from wood free from natural resins, an inorganic fibrous binder and a silicate filler.

7. A composition of matter for the manufacture by moulding under pressure of casings, covers and stoppers for electric accumulators comprising a vegetable pitch derived from wood free from natural resins, a fibrous binder, a silicate filler and a polymerized synthetic resin.

8. A composition of matter for the manufacture by moulding under pressure of casings, covers and stoppers for electric accumulators comprising a vegetable pitch derived from wood free from natural resins, a fibrous binder, a silicate filler and a fusible and refusible synthetic resin.

9. A composition of matter for the manufacture by moulding under pressure of casings, covers and stoppers for electric accumulators comprising:

|  | Per cent |
|---|---|
| Vegetable pitch derived from wood free from natural resins | 40–60 |
| Silicates | 20–40 |
| Fibrous material | 8–28 |

10. A composition of matter for the manufacture by moulding under pressure of casings, covers and stoppers for electric accumulators comprising:

|  | Per cent |
|---|---|
| Vegetable pitch derived from wood free from natural resins | 30–50 |
| Silicates | 15–35 |
| Fibrous material | 5–25 |
| Synthetic resin | 10–35 |

AUGUSTO SCHWIND.